United States Patent
Nitta

(10) Patent No.: US 10,810,056 B2
(45) Date of Patent: Oct. 20, 2020

(54) ADDING DESCRIPTIVE METADATA TO APPLICATION PROGRAMMING INTERFACES FOR CONSUMPTION BY AN INTELLIGENT AGENT

(71) Applicant: Microsoft Technology Licensing, LLC, Redmond, WA (US)

(72) Inventor: Bryston M. Nitta, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/868,905

(22) Filed: Jan. 11, 2018

(65) Prior Publication Data

US 2019/0213057 A1    Jul. 11, 2019

(51) Int. Cl.
*G06F 9/54* (2006.01)
*G06N 5/04* (2006.01)
*G06N 20/00* (2019.01)
*G06F 16/9032* (2019.01)
*G06F 16/903* (2019.01)
*G06F 16/332* (2019.01)
(Continued)

(52) U.S. Cl.
CPC .............. *G06F 9/541* (2013.01); *G06F 9/547* (2013.01); *G06F 16/3329* (2019.01); *G06F 16/3344* (2019.01); *G06F 16/90332* (2019.01); *G06F 16/90335* (2019.01); *G06F 40/279* (2020.01); *G06F 40/30* (2020.01); *G06N 5/043* (2013.01); *G06N 20/00* (2019.01)

(58) Field of Classification Search
CPC ............. G06F 9/541; G06F 17/30976; G06F 17/30979; G06F 17/2765; G06F 9/547; G06F 16/90332; G06F 16/90335; G06N 5/043
See application file for complete search history.

(56) References Cited

U.S. PATENT DOCUMENTS

2013/0110518 A1  5/2013 Gruber et al.
2015/0169385 A1* 6/2015 Allen ...................... G06F 9/541
                                                719/328
(Continued)

OTHER PUBLICATIONS

Maleshkova, et al., "Investigating Web APIson the World Wide Web", In Proceedings of 8th IEEE European Conference on Web Services, Dec. 1, 2010, pp. 107-114.
(Continued)

*Primary Examiner* — Charles E Anya
(74) *Attorney, Agent, or Firm* — Fiala & Weaver P.L.L.C.

(57) ABSTRACT

Systems, methods and computer program products are described herein that enable an intelligent agent to automatically discover an application programming interface (API) exposed by a service, to obtain descriptive metadata associated with the API, and to generate, based on the metadata, natural language processing information and/or function call building information associated with at least one functionality of the service. In addition, the intelligent agent is enabled to use the natural language processing information to determine that a user intends to interact with the service based on at least one user input of the user and to use the function call building information to build a function call for interacting with the service based on the at least one user input of the user, and to place the function call to the service on behalf of the user.

20 Claims, 6 Drawing Sheets

(51) Int. Cl.
    *G06F 16/33*    (2019.01)
    *G06F 40/30*    (2020.01)
    *G06F 40/279*    (2020.01)

(56) References Cited

U.S. PATENT DOCUMENTS

| | | | |
|---|---|---|---|
| 2017/0177561 A1* | 6/2017 | Peng | G06F 17/2705 |
| 2017/0220963 A1* | 8/2017 | Canaran | G06F 3/167 |
| 2018/0189347 A1* | 7/2018 | Ghafourifar | G06F 17/3043 |
| 2018/0284975 A1* | 10/2018 | Carrier | G06F 3/04847 |
| 2018/0307464 A1* | 10/2018 | Bijani | G06F 8/34 |

OTHER PUBLICATIONS

"International Search Report & Written Opinion Issued in PCT Application No. PCT/US2018/067766", dated Mar. 7, 2019, 13 Pages.

Zamanirad, et al., "Programming bots by synthesizing natural language expressions into API invocations", In Proceedings of 32nd IEEE/ACM International Conference on Automated Software Engineering, Oct. 30, 2017, pp. 832-837.

* cited by examiner

ADDING DESCRIPTIVE METADATA TO APPLICATION PROGRAMMING INTERFACES FOR CONSUMPTION BY AN INTELLIGENT AGENT

BACKGROUND

Conventionally, for a service (e.g. a Web service) to be accessible and/or recognizable by an intelligent agent (e.g., Amazon Alexa®, Apple® Siri®, Google Now™, Microsoft® Cortana®), a developer of the service must register the service with a publisher of the intelligent agent and must also take manual steps to train a natural language processor to recognize when a user is trying to invoke the service and to identify various user inputs that the user may provide to obtain the service. For example, a developer of a service for automated flight booking may be required to take manual steps to train a natural language processor to recognize a user's intent to invoke the service by recognizing user utterances or statements such as "Book Flight," "Book me a flight" or "Buy me a plane ticket". The developer of the service may also need to take manual steps to train the natural language processor to recognize certain keywords included in a user input as entities relevant to fulfilling the user's intent. For example, the developer may need to train the natural language processor to determine that a location and a date included in a user input are entities relevant for fulfilling the user's intent of booking a flight.

The registration and manual training process described above can be laborious and time consuming and typically must be performed separately for each intelligent agent through which the service will be offered. Thus, it is currently difficult for a developer of a service to make the service available via one or more intelligent agents.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are described herein that enable an intelligent agent to automatically discover an application programming interface (API) exposed by a service and to utilize descriptive metadata associated with the API to automatically train a natural language processor and/or function call builder to support invocation of and interaction with the service. For example, the API may be tagged with descriptive metadata (e.g., a plaintext description of the service or the capabilities thereof, one or more keywords associated with the service, or the like) and the intelligent agent may utilize such descriptive metadata to generate natural language processing information and function call building information associated with at least one functionality of the service. Furthermore, the intelligent agent may use the natural language processing information to determine that a user intends to interact with the service based on at least one user input of the user, use the function call building information to build a function call for interacting with the service based on the at least one user input of the user, and place the function call to the service on behalf of the user.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the application and, together with the description, further serve to explain the principles of the embodiments and to enable a person skilled in the relevant art(s) to make and use the embodiments.

Figure 1:
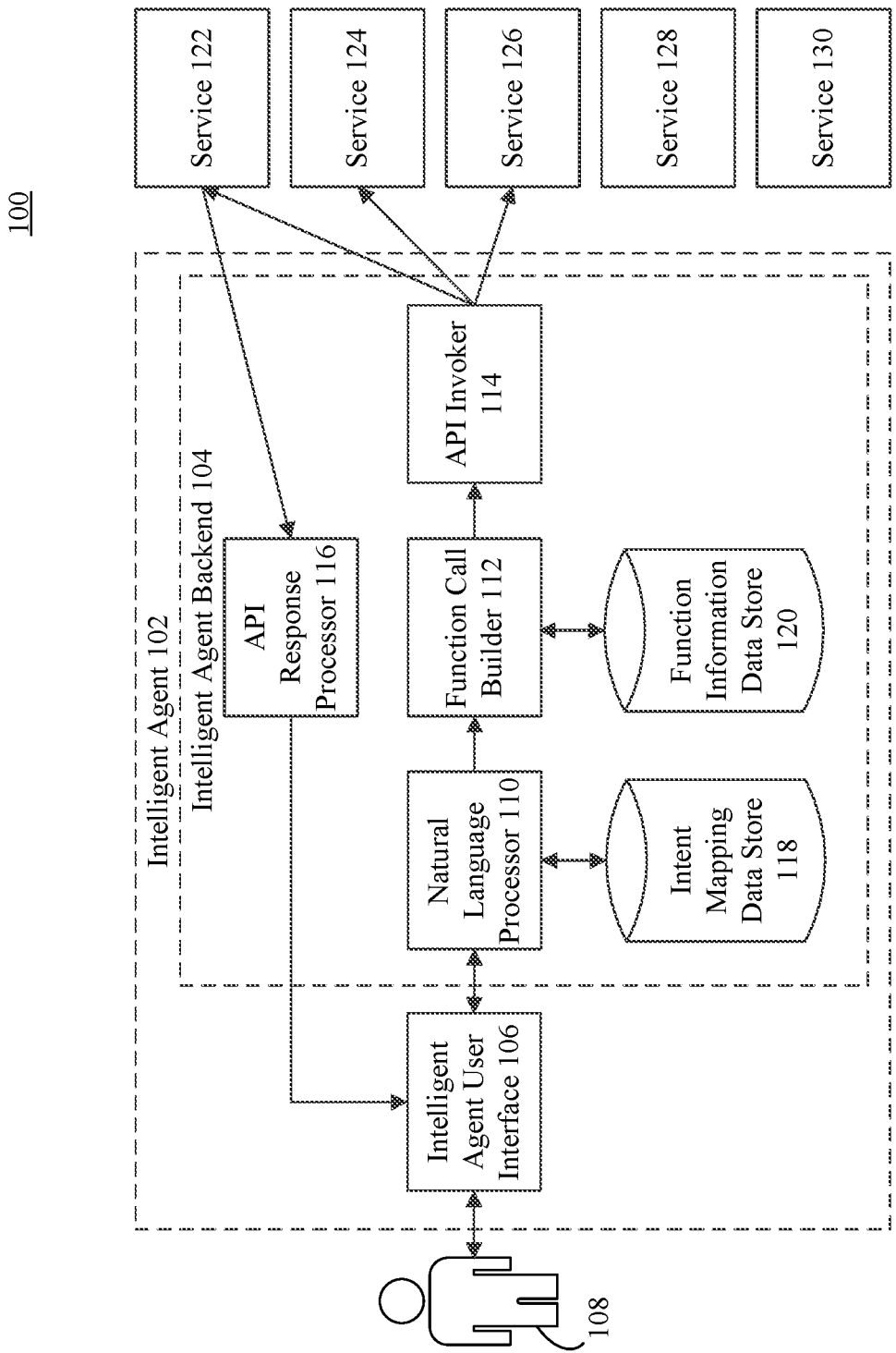
FIG. 1 is a block diagram of an example system that enables a user to invoke and interact with services via an intelligent agent.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Example embodiments described herein are directed to techniques that enable an intelligent agent to automatically discover an application programming interface (API) exposed by a service, to obtain descriptive metadata associated with the API, and to generate, based on the descriptive metadata, natural language processing information and function call building information associated with at least one functionality of the service that can be utilized by the intelligent agent to automatically train a natural language processor and function call builder to support invocation of and interaction with the service.

As used herein, the term "intelligent agent" broadly refers to any computer program that is capable of acting on behalf of a user or other computer program by matching an input provided thereby (e.g., text, voice, images) to executable commands. For example, an intelligent agent may be programmed to carry out an automated Internet search on behalf of a user thereof based on user input. An intelligent agent may also be programmed to perform data retrieval tasks for a user when scheduled to do so or when manually initiated by the user (e.g., via an utterance, an uploaded image, an online chat). By way of further illustration, an intelligent agent, using natural language processing and speech recognition technology, may retrieve and present information (e.g., today's temperature) in response to a verbal request from a user (e.g., "What is the temperature today?"). In addition, an intelligent agent may be programmed to continually learn using artificial intelligence techniques, such as machine learning. In particular, as a user interacts with an intelligent agent, the intelligent agent may learn from user input and becomes better at predicting the needs of the user.

In some implementations, an intelligent agent may be a cloud-based or server-based computer program that is integrated into Internet-connected devices and/or computer programs of the devices. For example, a user may interact with an intelligent agent through one or more devices such as smart speakers (e.g., Amazon® Echo®, Google™ Home, Apple® HomePod™), smart phones, laptop computers, notebook computers, tablet computers, netbooks, wearable computing devices (e.g., smart watches, smart glasses such as Google™ Glass™, etc.), appliances, smart vehicles, or desktop computers. Additionally, an intelligent agent may be built into an operating system (OS) (e.g., Siri® on iOS, Cortana on Microsoft® Windows® OS) of a device and/or an application independent of the OS of the device (e.g., Bixby® on Samsung Galaxy® S8).

In some implementations, an intelligent agent may assist a user in invoking a service and interacting therewith to perform a desired task. To help illustrate this, FIG. 1 will now be described. In particular, FIG. 1 is a block diagram of an example system 100 that enables a user to invoke and interact with services via an intelligent agent 102. For example, a user 108 may use utterances or other forms of user input to direct intelligent agent 102 to perform tasks on her behalf. These tasks may be performed through services accessible by intelligent agent 102 through APIs exposed by those services.

As used herein, the term "service" broadly refers to a computer program that can be accessed by other computer programs to perform one or more functions. One non-limiting example of a service is a Web service. In FIG. 1, example services 122, 124, 126, 128, and 130 are shown. Each of these services may be executing on a corresponding computing device. Example services 122, 124, 126, 128, and 130 may each expose an API that enables intelligent agent 102 and other computer programs to interact therewith via a network. Each of services 122, 124, 126, 128, and 130 may comprise any type of network-accessible service, such as database service, social networking service, messaging service, financial services service, news service, search service, productivity service, cloud storage and/or file hosting service, music streaming service, travel booking service, or the like. Examples of such services include but are by no means limited to a web-accessible SQL (structured query language) database, Salesforce.com™, Facebook®, Twitter®, Instagram®, Yammer®, LinkedIn®, Yahoo!® Finance, The New York Times® (at www.nytimes.com), Google™ search, Microsoft® Bing®, Google Docs™, Microsoft® Office 365, Dropbox®, Pandora® Internet Radio, National Public Radio®, Priceline.com®, etc.

As shown in FIG. 1, intelligent agent 102 includes an intelligent agent user interface (UI) 106 and an intelligent agent backend 104. Intelligent agent backend 104 includes a natural language processor 110, a function call builder 112, an API invoker 114, an API response processor 116, an intent mapping data store 118, and a function information data store 120. In accordance with one exemplary non-limiting implementation, intelligent agent UI 106 may be implemented in one or more end user devices, and intelligent agent backend 104 may be implemented on one or more servers that are accessible to the one or more end user devices via one or more networks.

Intent mapping data store 118 and function information data store 120 may comprise one or more data storage devices or systems. Example data storage devices include but are not limited to a magnetic disc (e.g., in a hard disk drive), an optical disc (e.g., in an optical disk drive), a magnetic tape (e.g., in a tape drive), a RAM device, a ROM device, network-attached storage, or the like. Example data storage systems include but are not limited to a storage area network. Data may be stored in intent mapping data store 118 and function information data store 120 in a variety of forms including but not limited to as databases and files.

As shown in FIG. 1, services 122, 124, and 126 are accessible by intelligent agent 102, as indicated by lines connecting API invoker 114 to services 122, 124, and 126. In accordance with system 100 of FIG. 1, a service is only accessible and/or recognizable by intelligent agent 102 after a developer of the service (or other entity) registers the service with a publisher of intelligent agent 102 and takes manual steps to train natural language processor 110 to recognize when the service is being invoked. Services 128 and 130 shown in FIG. 1 have not been registered with the publisher of intelligent agent 102 and natural language processor 110 has not been manually trained to recognize such services. Consequently, services 128 and 130 are not recognizable or accessible by intelligent agent 102.

Intelligent agent UI 106 is configured to be interacted with by a user, to capture user input from the interaction, and to provide the user input to natural language processor 110. For example, user 108 may interact with intelligent agent UI 106 by uttering one or more words (e.g., "What is the temperature today in Barcelona?"), and intelligent agent UI 106 may provide a representation of the utterance to natural language processor 110 to process. In embodiments, user 108 may also interact with intelligent agent UI 106 by typing a request into intelligent agent UI 106, by uploading an image to intelligent agent UI 106, or in some other manner to provide user input via intelligent agent UI 106 that is then passed to natural language processor 110 to process.

Natural language processor 110 is configured to analyze the user input to identify a user intent and also to extract entities from the user input that are relevant to fulfilling the user intent. For example, the user intent may comprise performing a particular action (e.g., scheduling a meeting, paying a bill, or finding a news article). In further accordance with this example, natural language processor 110 may process an utterance made by user 108 of "What is the temperature today in Barcelona?" and identify that the intent of user 108 is to obtain a temperature. Natural language processor 110 may also extract from the utterance the entities "today" and "Barcelona" which are relevant to fulfilling the intent of user 108. An intent may be used to trigger an action and/or serve to identify a service that can perform the action, and an entity relevant to performing the action may be used as a function call parameter associated with the service.

Natural language processor 110 may identify the intent of user 108, for example, by matching one or more keywords or phrases from the user input to entries stored in intent mapping data store 118. Intent mapping data store 118 may store mappings of a user intent to one or more keywords and/or phrases that a user may use to invoke a service. For example, the phrase "Book a ticket" and/or the keyword "ticket" may be mapped to an intent of "Book Flight". In further accordance with this example, natural language processor 110 may be configured to provide the intent and/or one or more entities associated with a user input to function call builder 112. In an embodiment, natural language processor 110 may also provide a measure of likelihood that a user intends to invoke a service associated with the intent to function call builder 112.

Function call builder 112 is configured to build a function call for interacting with a service based on an intent and one or more entities provided by natural language processor 110 and/or function information (e.g., function call syntax, parameters passed, type of value returned) which may be stored in function information data store 120. Function call builder 112 is further configured to provide the constructed function call for interacting with a service to API invoker 114. As noted above, function information data store 120 may store information related to constructing a function call associated with a service (e.g., function call syntax) and the parameters that should be passed in the function call. For example, function call builder 112 may construct a function call for the user input "What is the temperature today in Barcelona?" based on a template for a function call for interacting with a weather forecasting service that is stored in function information data store 120, wherein the entities "today" and "Barcelona" are inserted as parameters of the function call.

API invoker 114 is configured to place a function call received from function call builder 112 to a service associated with the function call. To illustrate, API invoker 114 may place a function call constructed by function call builder 112 in response to the user input of "What is the temperature today in Barcelona?" to an API exposed by service 122, which in this example comprises a weather forecasting service. As another example, API invoker 114 may place a function call constructed by function call builder 112 in response to the user input "Play jazz music" to an API exposed by service 124, which in this example comprises a music streaming service.

API response processor 116 is configured to receive responses from services invoked by intelligent agent 102 (e.g., service 122, service 124, service 126) and to provide the responses to user 108 via intelligent agent UI 106. For example, API response processor 116 may obtain the current temperature in Barcelona from service 122 and provide such information to user 108 via intelligent agent UI 106. For example, intelligent agent UI 106 may verbally communicate the temperature in Barcelona to user 108, although this is only one example and responses may also be communicated visually, for example, through text or images, or by other means. Responses provided by a service may also include music, news reports, or a wide variety of other types of content or information. Responses may also include questions or prompts intended to obtain additional information from a user.

As noted above, in accordance with system 100 of FIG. 1, for a service to be accessible and/or recognizable by intelligent agent 102, a developer of the service (or other entity) must register the service with a publisher of intelligent agent 102 and take manual steps to train natural language processor 110 to recognize when the service is being invoked. For example, a developer of service 128 for booking flights may be required to register service 128 with a publisher of intelligent agent 102 and take manual steps to train natural language processor 110 to recognize when a user intends to invoke service 128 by recognizing user utterances or statements such as "Book Flight," "Book me a flight" or "Buy me a plane ticket". The developer of service 128 may also need to take manual steps to train natural language processor 110 to recognize certain keywords included in a user input as entities relevant to fulfilling the user intent. For example, the developer may need to train natural language processor 110 to determine that a location and a date included in a user input are entities relevant for fulfilling the user's intent of booking a flight.

The registration and manual training process described above can be laborious and time consuming and typically must be performed separately for each intelligent agent through which the service will be offered. Thus, it is currently difficult for a developer of a service to make the service available via one or more intelligent agents.

Embodiments described herein address one or more of the above-mentioned issues by enabling an intelligent agent to automatically discover an API exposed by a service and to utilize descriptive metadata associated with the API to automatically train a natural language processor and function call builder to support invocation of and interaction with the service. For example, the API may be tagged with descriptive metadata (e.g., a plaintext description of the service or the capabilities thereof, one or more keywords associated with the service or the like) and the intelligent agent may utilize such descriptive metadata to generate natural language processing information and function call building information associated with at least one functionality of the service. Furthermore, the intelligent agent may use the natural language processing information to determine that a user intends to interact with the service based on at least one user input of the user, use the function call building information to build a function call for interacting with the service based on the at least one user input of the user, and place the function call to the service on behalf of the user.

Some advantages provided by embodiments described herein include but are by no means limited to: a service being automatically recognizable by an intelligent agent without a developer of the service registering the service with a publisher of the intelligent agent or taking manual steps to train a natural language processor of the intelligent agent; a service being recognized by multiple intelligent agents without the developer of the service having to perform the aforementioned process for each intelligent agent/publisher; an intelligent agent being able to provide users with access to new services as soon as such services are published; an increase in the capabilities of an intelligent agent by enabling the intelligent agent to automatically discover more services and invoke those services on behalf of a user; and providing a user of an intelligent agent with access to such additional services.

To further help illustrate the foregoing, FIG. 2 will now be described. In particular, FIG. 2 is a block diagram of an example system 200 that enables an intelligent agent 202 to automatically discover an API exposed by a service and to utilize descriptive metadata associated with the API to automatically train a natural language processor and function call builder to support invocation of and interaction with the service.

Figure 2:
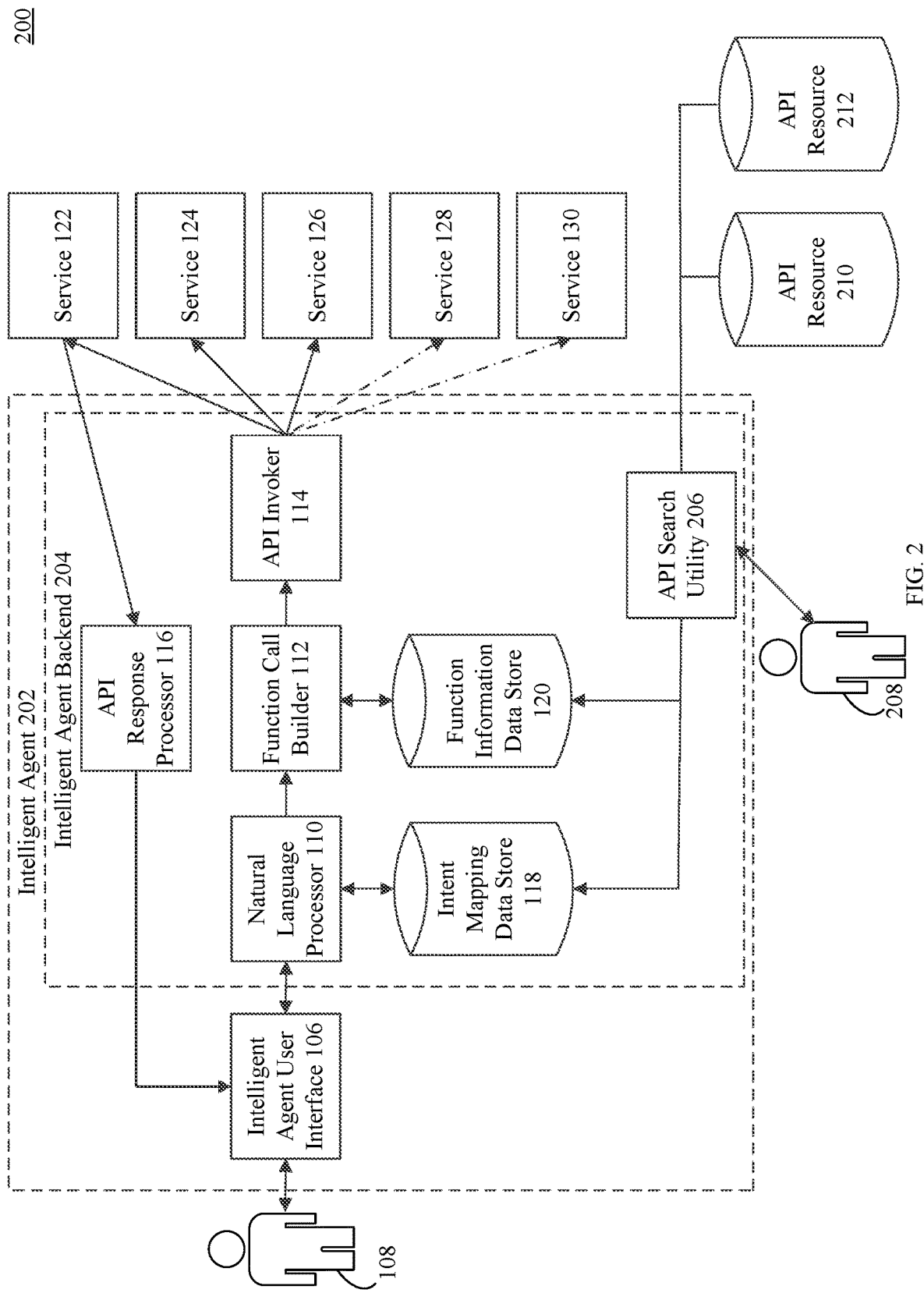
FIG. 2 is a block diagram of an example system that enables an intelligent agent to automatically discovery an application programming interface (API) exposed by a service and to utilize descriptive metadata associated with the API to automatically train a natural language processor and function call builder to support invocation of and interaction with the service.

As shown in FIG. 2, intelligent agent 202 includes intelligent agent UI 106 and an intelligent agent backend 204. Intelligent agent backend 204 includes natural language processor 110, function call builder 112, API invoker 114, API response processor 116, intent mapping data store 118, and function information data store 120. Intelligent agent UI 106, natural language processor 110, function call builder 112, API invoker 114, API response processor 116, intent mapping data store 118, and function information data store 120 were described above in reference to FIG. 1. Intelligent agent backend 204 of intelligent agent 202 further includes an API search utility 206. As also shown in FIG. 2, each of services 122, 124, 126, 128, and 130 are accessible by intelligent agent 202. As will be discussed below, services 128 and 130 may be discovered by intelligent agent 202 and subsequently accessed on behalf of a user.

API search utility 206 is configured to discover an API exposed by a service. For example, API search utility 206 may conduct an automated search of one or more resources to discover one or more APIs exposed by services not currently accessible to or recognizable by intelligent agent 202. In particular, API search utility 206 may search one or more resources (e.g., an API resource 210, an API resource 212) each of which may be accessible over a public network (e.g., the Internet) or a private network (e.g., an enterprise network) to discover APIs associated with services 128 and 130. For instance, API search utility 206 may discover an API exposed by service 128 in API resource 210 and an API exposed by service 130 in API resource 212. In another embodiment, APIs exposed by services 128 and 130 may be found in the same resource. Each of services 128 and 130 may be published by the publisher of intelligent agent 202 or by a third-party publisher.

In embodiments, API resources 210 and 212 may include one or more of the following types of resources: an API information repository (e.g., Google™ APIs Explorer), a software development kit (SDK), a developer resource website (e.g., Microsoft® Developer Network), or an API library. However, these examples are by no mean limiting and API resources 210 and 212 may encompass any of a wide variety of resources about APIs that may be accessible to API search utility 206.

In embodiments, API search utility 206 may be configured to execute a search automatically on a periodic or intermittent basis. For example, API search utility 206 may be configured to execute a search on an hourly, daily, weekly, or some other periodic basis. The frequency of the search may be managed or configured by a system administrator 208 or some other entity. In yet another embodiment, system administrator 208 or some other entity may interact directly with API search utility 206 to cause API search utility 206 to execute a search. In still another embodiment, natural language processor 110 or some other component of intelligent agent backend 204 may be configured to cause API search utility 206 to execute a search in response to determining that an intent of user 108 cannot be determined (or reliably determined) based on some user input. In this scenario, the user input provided by user 108 or some portion thereof may be used by API search utility 206 to focus or target the search. For example, keywords extracted from the user input may be used to formulate a search query that is used by API search utility 206 to perform an API search against one or more API resources.

API search utility 206 is further configured to obtain descriptive metadata associated with a discovered API. For example, API search utility 206 may also obtain descriptive metadata associated with the APIs exposed by services 128 and 130 from API resources 210 and 212. Additionally or alternatively, API search utility 206 may obtain descriptive metadata associated with the discovered APIs by querying the APIs themselves (e.g., via a get request through a Uniform Resource Locator (URL)). In embodiments, the descriptive metadata may include a plaintext description of the service that exposes the API and/or the capabilities thereof. The descriptive metadata may also include one or more keywords associated with the service. Additionally, in embodiments, the descriptive metadata may comprise one or more of structured or unstructured data.

In embodiments, a publisher of the API may publish the descriptive metadata as part of the API code itself. API search utility 206 may also be configured to obtain the descriptive metadata from comments in such code. Still further, the descriptive metadata may be crowdsourced (i.e., submitted by users).

API search utility 206 is still further configured to generate natural language processing information and function call building information associated with at least one functionality of the service based on the obtained descriptive metadata. For example, API search utility 206 may generate natural language processing information by determining, based on the descriptive metadata, a purpose or goal of a functionality provided by a service, parameters relevant to achieving the purpose or goal, and user inputs used to indicate an intent to invoke the functionality. To illustrate, descriptive metadata associated with an API exposed by a digital library service may describe a functionality of the service such as "remove the book and its contents" and a description of a parameter associated with the functionality such as "identifier (ID) of the book to be deleted." Based on this example descriptive metadata, API search utility 206 may determine: a purpose of the functionality of the digital library service to be to "remove book" from a user's digital library; a parameter relevant to removing a book to be an ID of the book; and some user inputs used to indicate an intent to perform the functionality such as "delete book" or "remove book." To further illustrate, API search utility 206 may store the natural language processing information generated in intent mapping data store 118, thereby creating a mapping between the functionality of the digital library service and user inputs "delete book" and "remove book" and indicating that an entity of a user input associated with the functionality is an ID of the book to be removed.

API search utility 206 may also generate function call building information (e.g., function call syntax, parameters passed, type of value returned) based on the obtained descriptive metadata and store function building information in function information data store 120. Alternatively, API search utility 206 may obtain such function call building information by searching various resources, which may include API resource 210 and API resource 212, and collecting data therefrom. For example, API search utility 206 may generate function call building information by collecting data from one or more of an API information repository (e.g., Google™ APIs Explorer), an SDK, a developer resource website (e.g., Microsoft® Developer Network), or an API library. However, these examples are by no mean limiting and API search utility may collect data used for generating function call building information from any of a wide variety of resources that may be accessible to API search utility 206.

In embodiments, a developer of a service may include natural language processing information and function call building information in a particular format in descriptive metadata associated with an API of the service so that natural language processing information and function call building information are easily detected and extracted by API search utility 206.

Figure 3:
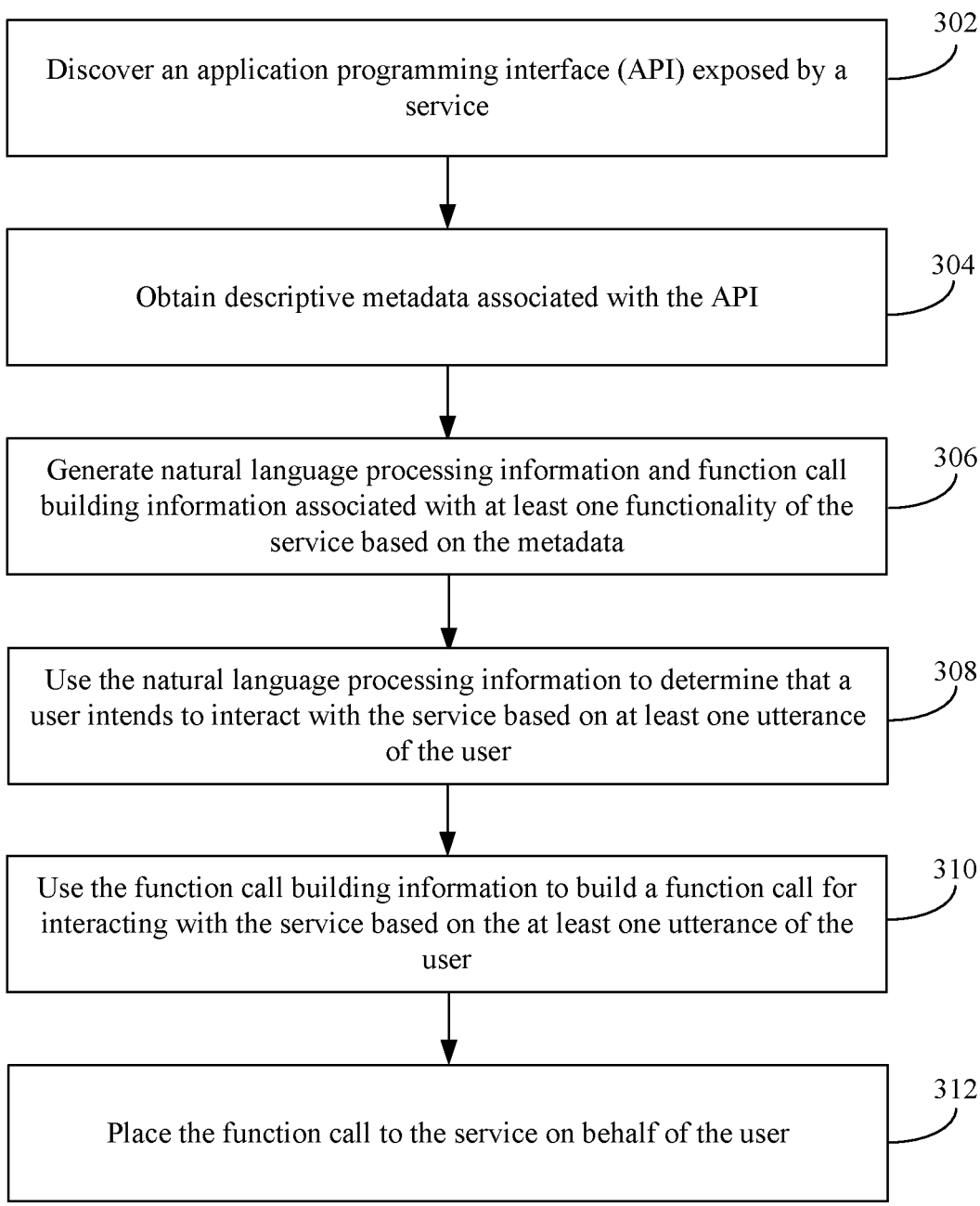
FIG. 3 depicts a flowchart of a method for enabling the automatic discovery of an API exposed by a service and the utilization of descriptive metadata associated with the API to automatically train a natural language processor and function call builder to support invocation of and interaction with the service, in accordance with an embodiment.

System 200 may thus operate in various ways to enable an intelligent agent to automatically discover an API exposed by a service and to invoke and interact with the newly-discovered API on behalf of a user. For instance, in embodiments, system 200 may operate according to FIG. 3. FIG. 3 depicts a flowchart 300 of a method for enabling the automatic discovery of an API exposed by a service and the utilization of descriptive metadata associated with the API to automatically train a natural language processor and function call builder to support invocation of and interaction with the service, according to an example embodiment. FIG. 3 will be described with continued reference to FIG. 2. However, other structural and operational embodiments will be apparent to persons skilled in the relevant art(s) based on the following discussion regarding flowchart 300.

As shown in FIG. 3, the method of flowchart 300 begins at step 302. In step 302, an API exposed by a service is discovered. For example, and with continued reference to FIG. 2, API search utility 206 may discover an API exposed by service 128 or service 130.

In an embodiment, the discovery of the API in step 302 may occur as part of a search that is executed by a system administrator or other entity through interaction with API search utility 206. In another embodiment, the discovery of the API in step 302 may occur as part of a search that is carried out automatically by API search utility 206. Such automatic search may be carried out on a periodic or intermittent basis. In still another embodiment, the discovery of the API in step 302 may occur in response to a determination that natural language processor 110 cannot identify (or reliably identify) a service that user 108 intends to interact with.

At step 304, descriptive metadata associated with the API is obtained. For example, and with continued reference to FIG. 2, API search utility 206 may obtain descriptive metadata associated with the API exposed by service 128 or service 130. As noted above, the descriptive metadata may comprise on or more of a plaintext description of the service or the capabilities thereof or one or more keywords associated with the service, although these examples are not intended to be limiting. As also noted above, the descriptive metadata may comprise one or more of structured or unstructured data.

In one embodiment, the descriptive metadata is obtained in step 304 by querying the API. For example, API search utility 206 may query the API exposed by service 128 or service 130 to obtain the descriptive metadata. In an alternate embodiment, the descriptive metadata is obtained in step 304 by searching one or more resources, such as but not limited to an API information repository, an SDK, a developer resource website, or an API library. For example, API search utility 206 may obtain the descriptive metadata by searching one or more of these resources.

At step 306, natural language processing information and function call building information is generated based on the descriptive metadata, wherein the natural language processing information and the function call information is associated with at least one functionality of the service. For example, and with continued reference to FIG. 2, API search utility 206 may generate natural language processing information and function call building information associated with at least one functionality of service 128 or service 130 based on the descriptive metadata.

In an alternate embodiment, the function call building information is not generated based on the descriptive metadata, but is instead generated based on data obtained from searching one or more resources. For example, API search utility 206 may search one or more resources to obtain data therefrom, and the function call building information can be generated based on the data. By way of example only, such resources may include but are by no means limited to an API information repository, an SDK, a developer resource website, or an API library. In a still further embodiment, the function call building information may be generated based on a combination of the descriptive metadata and data obtained by searching such resources.

After the natural language processing information has been generated in step 306, it may be stored in a data store accessible by a natural language processor of an intelligent agent. For example, after API search utility 206 has generated the natural language processing information, it may store such information in intent mapping data store 118 which is accessible by natural language processor 110 of intelligent agent 202. Likewise, after the function call building information has been generated in step 306, it may be stored in a data store that is accessible by a function call builder of the intelligent agent. For example, after API search utility 206 has generated the function call building information, it may store such information in function information data store 120 which is accessible by function call builder 112 of intelligent agent 202.

At step 308, the natural language processing information is used to determine that a user intends to interact with the service based on at least one utterance of the user. For example, and with continued reference to FIG. 2, natural language processor 110 may use the natural language processing information to determine that a user intends to interact with service 128 or service 130 based on at least one utterance of user 108. In further accordance with this example, natural language processor 110 may determine that a user intends to interact with service 128 or service 130 by mapping a keyword and/or phrase from the utterance of user 108 to service 128 or service 130, wherein such mapping is defined by or in accordance with the natural language processing information stored in intent mapping data store 118.

At step 310, the function call building information is used to build a function call for interacting with the service based on the at least one utterance of the user. For example, and with continued reference to FIG. 2, function call builder 112 may use the function call building information to build a function call for interacting with service 128 or service 130 based on the at least one utterance of the user. In further accordance with this example, function call builder 112 may use the function call building information stored in function information data store 120 to build a function call for interacting with service 128 or service 130.

At step 312, the function call is placed to the service on behalf of the user. For example, and with continued reference to FIG. 2, API invoker 114 places the function call to service 128 or service 130 on behalf of user 108.

Figure 4:
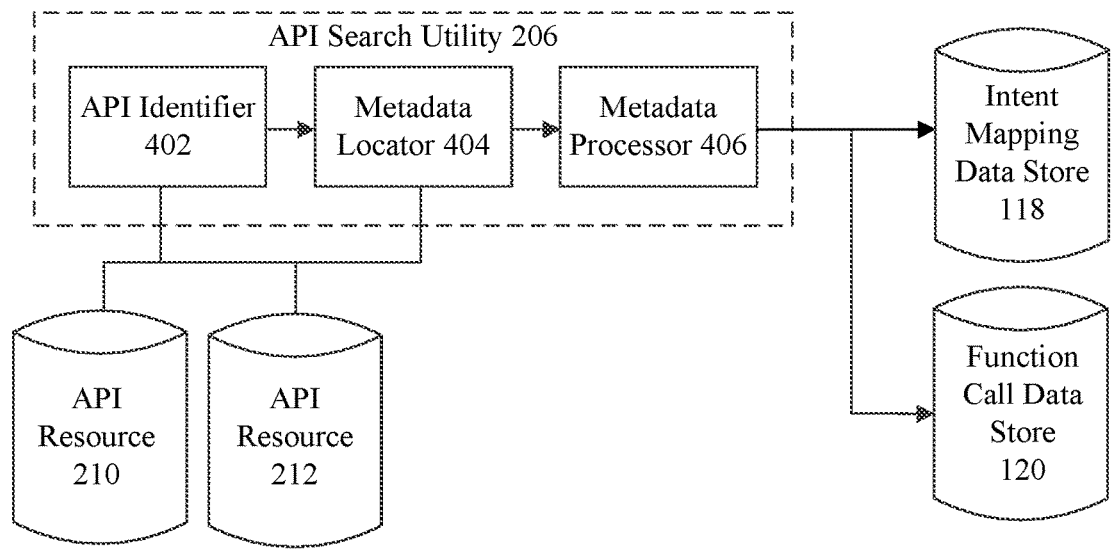
FIG. 4 is a block diagram of system that includes an API search utility that can automatically discover an API and process descriptive metadata associated with the API to generate natural language processing information and function call building information for use by an intelligent agent, in accordance with an embodiment.

To further help illustrate the foregoing, FIG. 4 will now be described. In particular, FIG. 4 is a block diagram of an example system 400 that includes an API search utility 206 that can automatically discover an API and process descriptive metadata associated with the API to generate natural language processing information and function call building information for use by an intelligent agent, in accordance with an embodiment. As shown in FIG. 4, API search utility 206 includes an API identifier 402, metadata locator 404, and metadata processor 406. API search utility 206 and each of its subcomponents may comprise software executing on one or more computing devices.

API identifier 402 is configured to discover an API exposed by a service. For example, API identifier 402 may search one or more resources to discover one or more APIs exposed by services. In particular, API identifier 402 may search one or more resources (e.g., a API resource 210, a API resource 212) to discover one or more APIs exposed by services.

Metadata locator 404 is configured to obtain descriptive metadata associated with a discovered API. For example, metadata locator 404 may also obtain descriptive metadata associated with discovered APIs from API resources 210 and/or 212. Additionally or alternatively, metadata locator 404 may obtain descriptive metadata associated with the discovered APIs from the APIs themselves, such as by querying the APIs (e.g., via a get request through a URL, or in some other manner). As was previously noted, descriptive metadata for a given API may also be obtained by parsing comments in API code. Such descriptive metadata may also be submitted by various users in a crowdsourcing approach.

Metadata processor 406 is configured to generate natural language processing information and function call building information associated with at least one functionality of the service based on the descriptive metadata obtained by metadata locator 404. In an alternate embodiment, metadata processor 406 may also generate the function call building information based on data obtained from one or more resources, such as but not limited to API resource 210 and/or API resource 212, or based on a combination of the descriptive metadata obtained by metadata locator 404 and data obtained from the one or more resources. Metadata processor 406 is also configured to store the natural language processing information in intent mapping data store 118 and the function call building information in function information data store 120. In embodiment, the natural language processing information is useable by an intelligent agent (e.g., intelligent agent 202 of FIG. 2) to determine that a user has invoked the service and the function call building information is useable by the intelligent agent to build a function call for interacting with the service.

Figure 5:
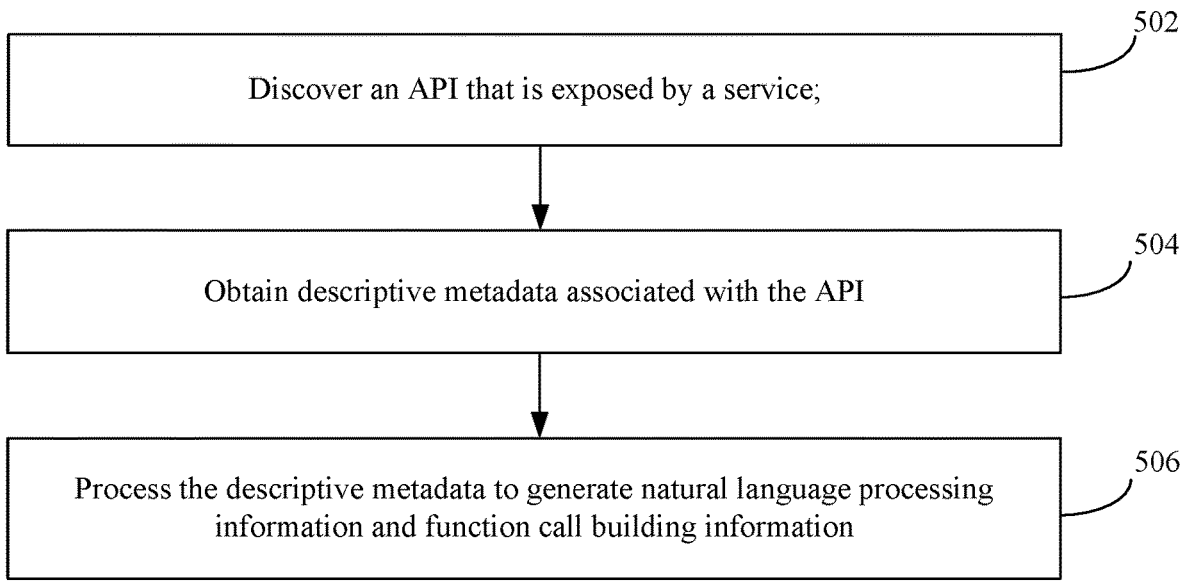
FIG. 5 depicts a flowchart of a method for discovering an API and processing descriptive metadata associated with the API to generate natural language processing information and function call building information for use by an intelligent agent, in accordance with an embodiment.

System 400 may thus operate in various ways to enable the processing of descriptive metadata associated with an API of a discovered service to generate natural language processing information and function call building information that can be used by an intelligent agent to invoke and/or interact with that service. For instance, in embodiments, system 400 may operate according to FIG. 5. FIG. 5 depicts a flowchart 500 of a method for discovering an API and processing descriptive metadata associated with the API to generate natural language processing information and function call building information for use by an intelligent agent, according to an example embodiment. FIG. 5 will be described with continued reference to FIG. 4. However, other structural and operational embodiments will be apparent to persons skilled in the relevant art(s) based on the following discussion regarding flowchart 400.

As shown in FIG. 5, the method of flowchart 500 begins at step 502. In step 502, an API exposed by a service is discovered. For example, and with continued reference to FIG. 4, API identifier 402 may discover an API.

At step 504, descriptive metadata associated with the API is obtained. For example, and with continued reference to FIG. 4, metadata locator 404 may obtain descriptive metadata associated with the discovered API.

At step 506, the descriptive metadata is processed to generate natural language processing information and function call building information. The natural language processing information is useable by an intelligent agent to determine that a user has invoked the service, and the function call building information is useable by the intelligent agent to build a function call for interacting with the service. For example, and with continued reference to FIG. 4, metadata processor 406 may process the metadata to generate the natural language processing information and the function call building information. As was mentioned, metadata processor 406 may also generate the function call building information based on data obtained from one or more resources instead of the descriptive metadata, or in addition to the descriptive metadata.

Figure 6:
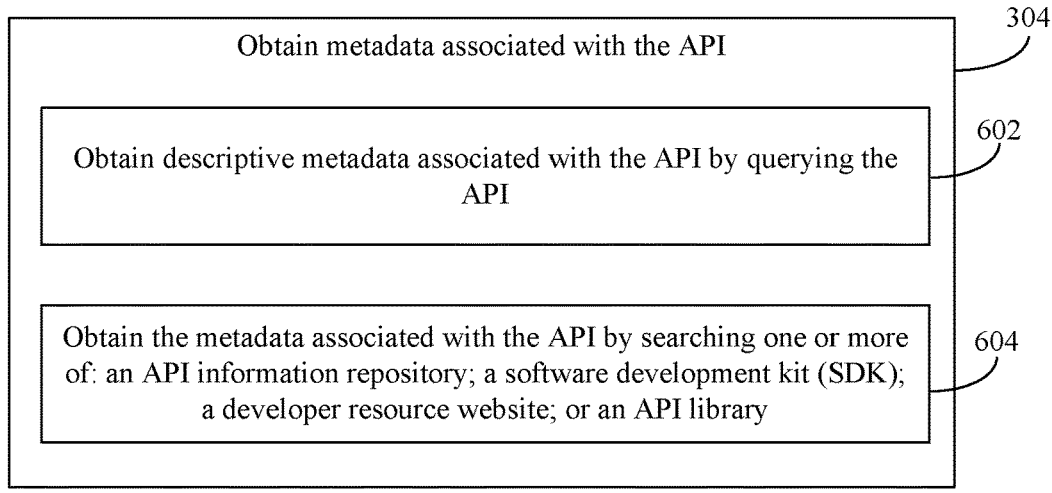
FIG. 6 depicts a flowchart of a method for obtaining descriptive metadata associated with an API, in accordance with an embodiment.

FIG. 6 depicts a flowchart 600 of a method for obtaining descriptive metadata associated with an API, in accordance with an embodiment. Steps 602 and 604 of FIG. 6 are methods of performing step 304 of FIG. 3. Steps 602 and 604 may be performed in combination or as alternatives to each other.

As shown in FIG. 6, the method of flowchart 600 begins at step 602. In step 602, the metadata associated with the API is obtained by querying the API. For example, and with continued reference to FIG. 2, API search utility 206 may obtain the metadata associated with the API by querying the API.

At step 604, the metadata associated with the API is obtained by searching one or more of an API information repository, an SDK, a developer resource website, or an API library. For example, and with continued reference to FIG. 2, API search utility 206 may obtain the metadata associated with the API by searching one or more of: an API information repository, an SDK, a developer resource website, or an API library.

Figure 7:
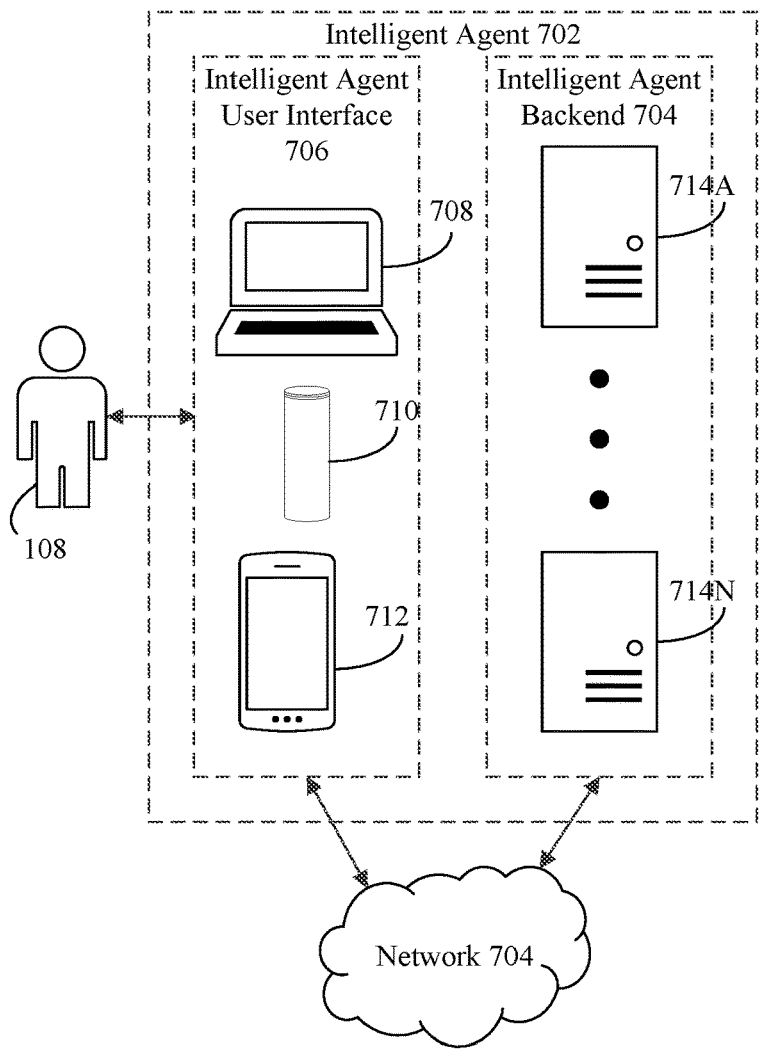
FIG. 7 is an block diagram of a system that includes an example implementation of an intelligent agent, in accordance with an embodiment.

To further help illustrate the foregoing, FIG. 7 will now be described. FIG. 7 is a block diagram of a system 700 that includes an example implementation of an intelligent agent 702, in accordance with an embodiment. Intelligent agent 702 may be an example embodiment of intelligent agent 202 of FIG. 2. As shown in FIG. 7, intelligent agent 702 includes an intelligent agent user interface (UI) 706, which may be an example of intelligent agent UI 106, and an intelligent agent backend 704, which may be an example of intelligent agent backend 204.

Intelligent agent 702 may be a cloud-based or server-based computer program that is integrated into internet-connected devices and/or computer programs of the devices. For example, intelligent agent UI 706 may be implemented in one or more devices, such as a smart speaker 710, a smart phone 712, and a laptop computer 708. For example, user 108 may interact with intelligent agent 702 through smart speaker 710, smart phone 712, and laptop computer 708. Intelligent agent backend 704 of intelligent agent 702 may be implemented on one or more servers (e.g., 714A, 714N) in one or more data centers or other remote locations. Intelligent agent UI 706 may send user requests from user 108 to be processed by intelligent agent backend 704 of intelligent agent 702 over network 704 and backend 704 of intelligent agent 702 may send responses to user requests to be communicated to user 108 to intelligent agent user interface 706 over network 704. However, this implementation is only exemplary and it is to be understood that the components of intelligent agent 702 may be implemented on the same device, or on different devices than those shown in FIG. 7.

III. Example Computer System Implementations

Any of the components of systems 100, 200, 400 and 700 and any of the steps of the flowcharts of FIGS. 3, 5 and 6 may be implemented in hardware, or hardware with any combination of software and/or firmware, including being implemented as computer program code configured to be executed in one or more processors and stored in a computer readable storage medium, or being implemented as hardware logic/electrical circuitry, such as being implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 8:
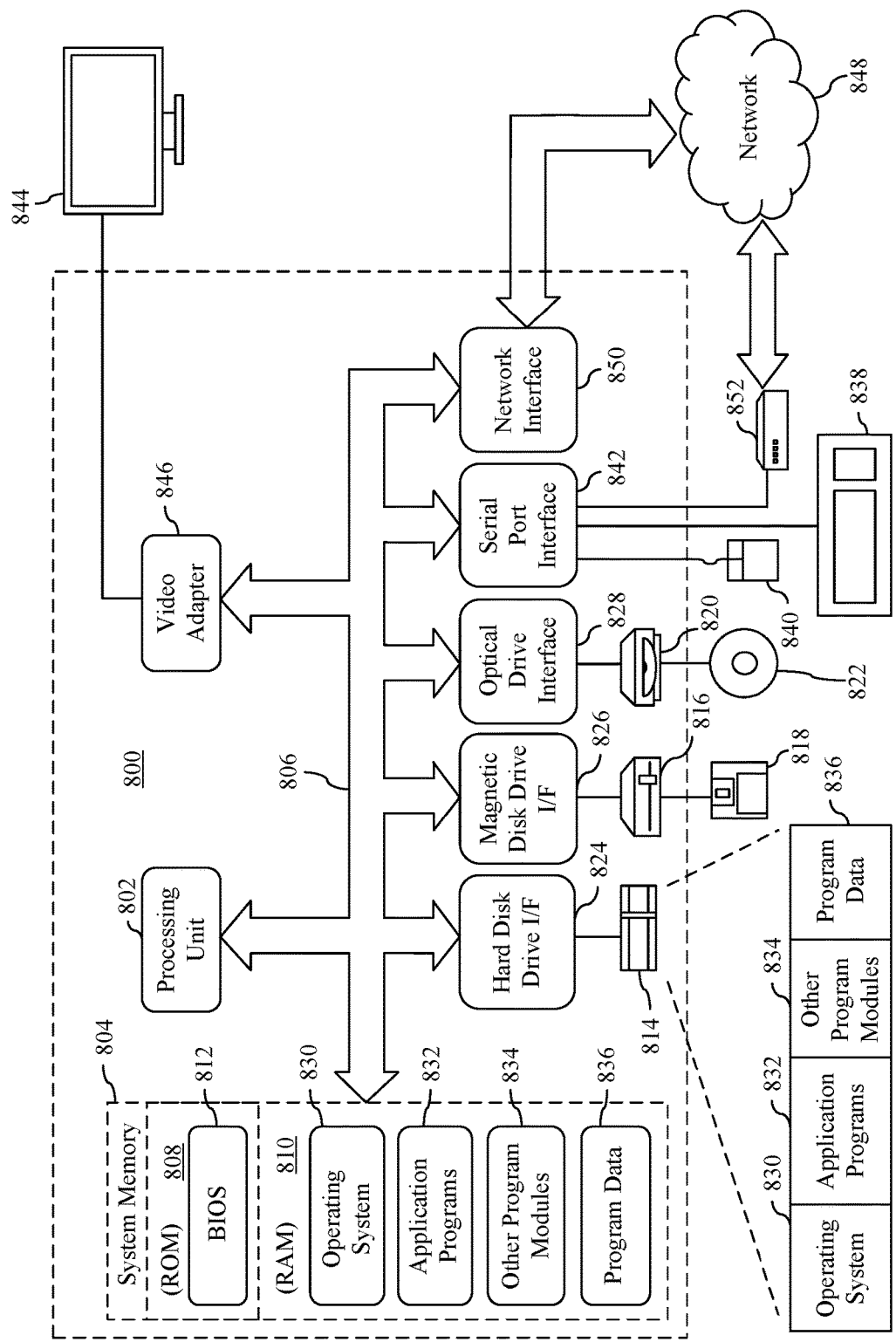
FIG. 8 is a block diagram of an example processor-based computer system that may be used to implement various embodiments.

FIG. 8 depicts an example processor-based computer system 800 that may be used to implement various embodiments described herein, such as any of the embodiments described in the Sections above and in reference to FIGS. 1-7. For example, processor-based computer system 800 may be used to implement any of the components of systems 100, 200, 400, and 700 as described above in reference to FIGS. 1, 2, 4, and 7 as well as any of the flowcharts described above in reference to FIGS. 3, 5, and 6. The description of system 800 provided herein is provided for purposes of illustration, and is not intended to be limiting. Embodiments may be implemented in further types of computer systems, as would be known to persons skilled in the relevant art(s).

As shown in FIG. 8, system 800 includes a processing unit 802, a system memory 804, and a bus 806 that couples various system components including system memory 804 to processing unit 802. Processing unit 802 may comprise one or more hardware-implemented microprocessors or microprocessor cores. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

System 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, BLU-RAY™ disk or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as solid state drives (SSDs), flash memory cards, digital video disks, random access memories (RAMs), read only memories (ROM), and the like.

A number of program modules may be stored on the hard disk, magnetic disk, optical disk, ROM, or RAM. These program modules include an operating system 830, one or more application programs 832, other program modules 834, and program data 836. In accordance with various embodiments, the program modules may include computer program logic that is executable by processing unit 802 to implement any of the embodiments described in the Sections above and in reference to FIGS. 1-7. For example, the program modules may include computer program logic that is executable by processing unit 802 to implement any of the components of systems 100, 200, 400, and 700 as described above in reference to FIGS. 1, 2, 4, and 7 as well as any of the flowcharts described above in reference to FIGS. 3, 5, and 6.

A user may enter commands and information into system 800 through input devices such as a keyboard 838 and a pointing device 840 (e.g., a mouse). Other input devices (not shown) may include a microphone, joystick, game controller, scanner, or the like. In one embodiment, a touch screen is provided in conjunction with a display 844 to allow a user to provide user input via the application of a touch (as by a finger or stylus for example) to one or more points on the touch screen. These and other input devices are often connected to processing unit 802 through a serial port interface 842 that is coupled to bus 806, but may be connected by other interfaces, such as a parallel port, game port, or a universal serial bus (USB). Such interfaces may be wired or wireless interfaces.

Display 844 is connected to bus 806 via an interface, such as a video adapter 846. In addition to display 844, system 800 may include other peripheral output devices (not shown) such as speakers and printers.

System 800 is connected to a network 848 (e.g., a local area network or wide area network such as the Internet) through a network interface 850, a modem 852, or other suitable means for establishing communications over the network. Modem 852, which may be internal or external, is connected to bus 806 via serial port interface 842. System 800 may include multiple network interfaces.

As used herein, the terms "computer program medium," "computer-readable medium," and "computer-readable storage medium" are used to generally refer to memory devices or storage structures such as the hard disk associated with hard disk drive 814, removable magnetic disk 818, removable optical disk 822, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media As noted above, computer programs and modules (including application programs 832 and other program modules 834) may be stored on the hard disk, magnetic disk, optical disk, ROM, or RAM. Such computer programs may also be received via network interface 850, serial port interface 842, or any other interface type. Such computer programs, when executed or loaded by an application, enable system 800 to implement features of embodiments discussed herein. Accordingly, such computer programs represent controllers of the system 800.

Embodiments are also directed to computer program products comprising software stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

IV. Additional Example Embodiments

In an embodiment, a system comprises: one or more processors; one or more memory devices connected to the one or more processors, the one or more memory devices storing computer program logic for execution by the one or more processors, the computer program logic including: an application programming interface (API) search utility that is configured to discover an API exposed by a service, to obtain descriptive metadata associated with the API, and to generate natural language processing information based on the descriptive metadata; a natural language processor that is configured to use the natural language processing information to determine that a user intends to interact with the service based on at least one user input of the user; a function call builder that is configured to use function call building information associated with at least one functionality of the service to build a function call for interacting with the service based on the at least one user input of the user; and an API invoker that is configured to place the function call to the service on behalf of the user.

In an embodiment of the foregoing system, the descriptive metadata comprises one or more of: a plaintext description of the service or the capabilities thereof; or one or more keywords associated with the service.

In an embodiment of the foregoing system, the descriptive metadata comprises one or more of structured or unstructured data.

In an embodiment of the foregoing system, the API search utility is configured to obtain the descriptive metadata associated with the API by querying the API.

In an embodiment of the foregoing system, the API search utility is configured to obtain the descriptive metadata associated with the API by searching one or more of: an API information repository; a software development kit (SDK); a developer resource website; or an API library.

In an embodiment of the foregoing system, the API search utility is configured to discover the API in response to a determination that the natural language processor cannot identify a service that the user intends to interact with.

In an embodiment of the foregoing system, the API search utility is configured to be executed by a system administrator or automatically on a periodic or intermittent basis.

In an embodiment of the foregoing system, the API search utility is further configured to generate the function call building information based on the descriptive metadata.

In an embodiment of the foregoing system, the API search utility is further configured to generate the function call building information based on information obtained by searching one or more of: an API information repository; a software development kit (SDK); a developer resource website; or an API library.

In an embodiment, a system comprises: one or more processors; one or more memory devices connected to the one or more processors, the one or more memory devices storing computer program logic for execution by the one or more processors, the computer program logic including: an application programming interface (API) search utility that comprises: an API identifier that is configured to discover an API that is exposed by a service; a metadata locator that is configured to obtain descriptive metadata associated with the API; and a metadata processor that is configured to process the descriptive metadata to generate natural language processing information, the natural language processing information being useable by an intelligent agent to determine that a user has invoked the service.

In an embodiment of the foregoing system, the metadata locator is configured to obtain the descriptive metadata associated with the API by querying the API.

In an embodiment of the foregoing system, the metadata locator is configured to obtain the descriptive metadata associated with the API by searching one or more of: an API information repository; a software development kit (SDK); a developer resource website; or an API library.

In an embodiment of the foregoing system, the metadata processor is further configured to store the natural language processing information in a data store accessible by a natural language processor of the intelligent agent.

In an embodiment of the foregoing system, the metadata processor is further configured to process the descriptive metadata to generate function call building information, the function call building information being useable by the intelligent agent to build a function call for interacting with the service.

In an embodiment of the foregoing system, the metadata processor is further configured to store the function call building information in a data store accessible by a function call builder of the intelligent agent.

In another embodiment, a method implemented by one or more computing devices comprises: discovering an application programming interface (API) exposed by a service; obtaining descriptive metadata associated with the API; generating natural language processing information associated with at least one functionality of the service based on the descriptive metadata; using the natural language processing information to determine that a user intends to interact with the service based on at least one user input of the user; using function call building information to build a function call for interacting with the service based on the at least one user input of the user; and placing the function call to the service on behalf of the user.

In an embodiment of the foregoing method, the descriptive metadata comprises one or more of: a plaintext description of the service or the capabilities thereof; or one or more keywords associated with the service.

In an embodiment of the foregoing method, the descriptive metadata comprises one or more of structured or unstructured data.

In an embodiment of the foregoing method, obtaining the descriptive metadata associated with the API comprises querying the API.

In an embodiment of the foregoing method, obtaining the descriptive metadata associated with the API comprises searching one or more of: an API information repository; a software development kit (SDK); a developer resource website; or an API library.

V. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A system for automatically discovering application programming interfaces (APIs) exposed by services, the system comprising:
   one or more processors;
   one or more memory devices connected to the one or more processors, the one or more memory devices storing computer program logic for execution by the one or more processors, the computer program logic including:
      an application programming interface (API) search utility that is configured to discover an API exposed by a service that a natural language processor of the system is not currently trained to recognize, to obtain descriptive metadata associated with the newly discovered API, and to use the descriptive metadata to generate natural language processing information that comprises a mapping between a user input and a functionality of the service;
      the natural language processor that is configured to determine that a user intends to interact with the service based on the natural language processing information and receiving the user input from the user;
      a function call builder that is configured to build a function call for interacting with the service based on function call building information associated with the functionality of the service and receiving the user input from the user; and
      an API invoker that is configured to place the function call to the service on behalf of the user.

2. The system of claim 1, wherein the descriptive metadata comprises one or more of:
   a plaintext description of the service or the capabilities thereof; or
   one or more keywords associated with the service.

3. The system of claim 1, wherein the descriptive metadata comprises one or more of structured or unstructured data.

4. The system of claim 1, wherein the API search utility is configured to obtain the descriptive metadata associated with the API by querying the API.

5. The system of claim 1, wherein the API search utility is configured to obtain the descriptive metadata associated with the API by searching one or more of:
   an API information repository;
   a software development kit (SDK);
   a developer resource website; or
   an API library.

6. The system of claim 1, wherein the API search utility is configured to discover the API in response to a determination that the natural language processor cannot identify a service that the user intends to interact with.

7. The system of claim 1, wherein the API search utility is configured to be executed by a system administrator or automatically on a periodic or intermittent basis.

8. The system of claim 1, wherein the API search utility is further configured to generate the function call building information based on the descriptive metadata.

9. The system of claim 1, wherein the API search utility is further configured to generate the function call building information based on information obtained by searching one or more of:
   an API information repository;
   a software development kit (SDK);
   a developer resource website; or
   an API library.

10. A system for automatically discovering application programming interfaces (APIs) exposed by services, the system comprising:
   one or more processors;
   one or more memory devices connected to the one or more processors, the one or more memory devices storing computer program logic for execution by the one or more processors, the computer program logic including;
an application programming interface (API) search utility that comprises:
an API identifier that is configured to discover an API that is exposed by a service that a natural language processor of an intelligent agent is not currently trained to recognize;
a metadata locator that is configured to obtain descriptive metadata with the newly discovered API; and
a metadata processor that is configured to process the descriptive metadata to generate natural language processing Information that comprises a mapping between a user input and a functionality of the service, the natural language processing information being useable by the natural language processor of the intelligent agent to determine that a user has invoked the service.

11. The system claim 10, wherein the metadata locator is configured to obtain the descriptive metadata associated with the API by querying the API.

12. The system of claim 10, wherein the metadata locator is configured to obtain the descriptive metadata associated with the API by searching one or more of:
an API information repository;
a software development kit (SDK);
a developer resource website; or
an API library.

13. The system of claim 10, wherein the metadata processor is further configured to store the natural language processing information in a data store accessible by the natural language processor of the intelligent agent.

14. The system of claim 10, wherein the metadata processor is further configured to process the descriptive metadata to generate function call building information, the function call building information being useable by the intelligent agent to build a function call for interacting with the service.

15. The system of claim 10, wherein the metadata processor is further configured to store the function call building information in a data store accessible by a function call builder of the intelligent agent.

16. A method implemented by one or more computing devices of a system for automatically discovering application programming interfaces (APIs) exposed by services: the method comprising:
discovering an application programming interface (API) exposed by a service that a natural language processor of the system is not currently trained to recognize;
obtaining descriptive metadata associated with the newly discovered API;
generating, by using the descriptive metadata, natural language processing information comprising a mapping between a user input and a functionality of the service determining that a user intends to interact with the service based on the natural language processing information and receiving the user input from the user;
building a function call for interacting with the service based on functional call building information and receiving the user input from the user; and
placing the function call to the service on behalf of the user.

17. The method of claim 16, wherein the descriptive metadata comprises one or more of:
a plaintext description of the service or the capabilities thereof; or
one or more keywords associated with the service.

18. The method of claim 16, wherein the descriptive metadata comprises one or more of structured or unstructured data.

19. The method of claim 16, wherein obtaining the descriptive metadata associated with the API comprises querying the API.

20. The method of claim 16, wherein obtaining the descriptive metadata associated with the API comprises searching one or more of:
an API information repository;
a software development kit (SDK);
a developer resource website; or
an API library.

* * * * *